United States Patent
Deshmukh

(10) Patent No.: US 9,584,423 B2
(45) Date of Patent: Feb. 28, 2017

(54) DYNAMIC RESOURCE REPOSITIONING LOAD BALANCING AND LOCATION MANAGEMENT SYSTEM AND METHOD

(71) Applicant: Sudarshan Deshmukh, Pune (IN)

(72) Inventor: Sudarshan Deshmukh, Pune (IN)

( * ) Notice: Subject to any disclaimer, the term of this patent is extended or adjusted under 35 U.S.C. 154(b) by 102 days.

(21) Appl. No.: 14/499,157

(22) Filed: Sep. 27, 2014

(65) Prior Publication Data

US 2015/0092557 A1 Apr. 2, 2015

(30) Foreign Application Priority Data

Sep. 27, 2013 (IN) .......................... 3081/MUM/2013

(51) Int. Cl.
*H04L 12/803* (2013.01)
*G06F 9/50* (2006.01)
*H04L 29/08* (2006.01)

(52) U.S. Cl.
CPC .......... *H04L 47/125* (2013.01); *G06F 9/5072* (2013.01); *H04L 67/10* (2013.01); *H04L 67/1002* (2013.01)

(58) Field of Classification Search
None
See application file for complete search history.

(56) References Cited

U.S. PATENT DOCUMENTS

| | | | | |
|---|---|---|---|---|
| 2004/0244006 A1* | 12/2004 | Kaufman | .............. | G06F 9/5066 718/105 |
| 2004/0260799 A1* | 12/2004 | Bates | .................... | H04L 67/104 709/223 |
| 2006/0039385 A1* | 2/2006 | Bare | ........................ | H04L 12/18 370/400 |
| 2008/0216087 A1* | 9/2008 | Dillenberger | ........... | G06F 9/505 718/105 |
| 2010/0113159 A1* | 5/2010 | Chapman | .................. | A63F 3/04 463/42 |
| 2012/0290582 A1 | 11/2012 | Oikarinen | | |

FOREIGN PATENT DOCUMENTS

WO WO0116739 9/2001

\* cited by examiner

*Primary Examiner* — Chi H Pham
*Assistant Examiner* — Vladislav Agureyev
(74) *Attorney, Agent, or Firm* — Ryan Alley IP

(57) ABSTRACT

A dynamic resource repositioning load balancing and location management system repositions an incoming resource in a grid network of nodes. The system includes a first mapping device to map topology of said gird network of nodes, along with its resources; a determination device to determine at least an incoming resource's initial placement in terms of relative position of said node that the resource currently occupies and in terms of relative number of edges on which said resource currently resides; and resource repositioning device to reposition said at least a resource, in said grid network of nodes, in response to an incoming resource, said repositioning based on said determined position of said incoming resource; characterized, in that, said repositioning mechanism being guided by at least a step or a combination of steps or repetition of steps selected from a group of steps.

12 Claims, 7 Drawing Sheets

Grid -1

Grid -2

Grid -3

Grid – 4

Grid -1 (Add 5)

Grid -2 (Add 7)

Grid -3 (Add 10)

Grid – 4 (Add 8)

Grid -1

Grid -2

Grid -3

Grid - 4

Grid -1

Grid -2

Grid -3

Grid - 4

DYNAMIC RESOURCE REPOSITIONING LOAD BALANCING AND LOCATION MANAGEMENT SYSTEM AND METHOD

FIELD

This invention relates to the field of network systems and network architecture.

Particularly, this invention relates to the field of load balancing and location management in network systems and network architecture.

Specifically, this invention relates to a dynamic resource repositioning load balancing and location management system and method.

BACKGROUND

A network system is defined as a group of nodes which are interconnected in a pre-determined fashion. The nodes may work in a synchronous manner, in an asynchronous manner, in a collaborative manner, in a distinctive manner, in a sequential manner, in a non-sequential manner, in a discrete manner, in a pattern, out of a pattern, or in any type of manner predetermined by the intended use of the network.

In networking, load refers to the amount of data (traffic) being carried by a network. One of the parameters of an efficient system, especially, of a network system is the amount of load that it handles.

For many loads; whether physical or virtual, load distribution is an important function of network attributes. Load changes may be in the form of load addition, load deletion, or mere load change. This comprises resource additional, resource deletion, resource changes, node addition, node deletion, node changes, data addition, data deletion, data changes, and/or the like.

Network Load Balancing (NLB) is the management of traffic across a network.

In at least a first embodiment, Network Load Balancing distributes workload across multiple CPUs, disk drives and other resources in an effort to use network resources more efficiently and avoid network overload. Load balancing may be accomplished through software or hardware.

Network load balancing is an efficient and cost-effective solution designed to enhance availability and scalability of Internet applications by allowing system administrators to build clusters, which are load balanced with incoming client requests.

In at least a second embodiment, a load balancer is a device that acts as a reverse proxy and distributes network or application traffic across a number of servers. Load balancers are used to increase capacity (concurrent users) and reliability of applications. They improve the overall performance of applications by decreasing the burden on servers associated with managing and maintaining application and network sessions, as well as by performing application-specific tasks.

In at least a third embodiment, Network Load Balancing distributes IP traffic across multiple cluster hosts. It also ensures high availability by detecting host failures and automatically redistributing traffic to the surviving hosts. Network Load Balancing provides remote controllability and supports rolling upgrades.

Typically, Network Load Balancing enables a network to deliver high performance and failover protection Network Load Balancing servers (also called hosts) in a cluster communicate among themselves to provide key benefits, including scalability and high availability (of nodes).

In at least a fourth embodiment, Network Load Balancing uses port rules to customize load balancing. Port rules can select either multiple-host or single-host load-balancing policies. Port rules also comprise handling priority.

According to the prior art, one of the techniques for load distribution is a DHT (Distributed Hash Table) technique. This technique considers logical distance between the nodes. This technique makes a choice of destination node to transfer the extra load on the basis of logical distance analysis, and not on physical distance measure.

According to the prior art, one of the techniques for load distribution is a Static Load Balancing technique. This technique is not suitable for distributed applications.

According to the prior art, one of the techniques for load distribution Dynamic Load Balancing technique. This technique is not suitable when the system in stable enough.

Furthermore, according to the prior art, all prior art technologies are not scalable in a co-ordinated manner.

FIG. 1 illustrates one of the existing models of grid layout. Below is an associated Table 1.

TABLE 1

| Time Instance | Number of resources available | No. of resources added | Grid-1 | Grid-2 | Grid-3 | Grid-4 |
|---|---|---|---|---|---|---|
| T1 | 32 * 4 = 128 | 0 | 32 | 32 | 32 | 32 |

FIG. 2 illustrates one more of the existing models of grid layout, where resources and nodes have been added. Below is an associated Table 2.

TABLE 2

| Time Instance | Number of resources available | No. of resources added | Grid-1 | Grid-2 | Grid-3 | Grid-4 |
|---|---|---|---|---|---|---|
| T2 | 32 * 4 = 128 | 30 | 32 + 5 = 37 | 32 + 7 = 39 | 32 + 10 = 42 | 32 + 8 = 40 |

SUMMARY

An object of the invention is to balance loads.

Another object of the invention is to balance loads, of any type, in a network.

Yet another object of the invention is to balance additional loads, of any type, in a network.

Still another object of the invention is to provide a location management scheme for load balancing in order to balance resources over a given cluster to make best utilization of system (network).

Still another object of the invention is to provide a location management scheme for load balancing, upon addition of resources, in order to balance resources over defined nodes in order to make best utilization of system (network).

An additional object of the invention is to provide an efficient load balancing scheme for grid based networks and systems.

Yet an additional object of the invention is to provide a resource repositioning system and method for arrangement, displacement, and repositioning of resources from one area to another area in a pre-determined fashion such that network (comprising the resources) load index is kept constant up to n number of next insertions.

Still an additional object of the invention is to provide a resource repositioning system and method for arrangement, displacement, and repositioning of nodes from one area to another area in a pre-determined fashion such that network (comprising the nodes) load index is kept constant up to n number of next insertions.

According to this invention, there is provided a dynamic resource repositioning load balancing and location management system in order to reposition an incoming resource in a grid network of nodes, said system comprises:
- at least a first mapping mechanism in order to map topology of said grid network of nodes, along with its resources;
- at least a determination mechanism in order to determine at least an incoming resource's initial placement in terms of relative position of said node that the resource currently occupies and in terms of relative number of edges on which said resource currently resides, said relative position being selected from a corner node or an intermittent node in respect of a designated grid;
- resource repositioning mechanism in order to reposition said at least a resource, in said grid network of nodes, in response to an incoming resource, said repositioning based on said determined position of said incoming resource; characterised, in that, said repositioning mechanism being guided by at least a step or a combination of steps or repetition of steps selected from a group of steps consisting of the following:
  - for any additional incoming resource on an existing intermittent node, in a designated grid, balancing at least one of the adjacent edges, belonging to that particular grid, by shifting a resource from an adjacent corner grid to any of the corresponding adjacent intermittent nodes;
  - for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent the first adjacent edge but not being the original edge where the incoming resource was placed, by shifting a resource from a corner node of said first adjacent edge to a (next) corner edge of said second adjacent edge.

Typically, said at least a determination mechanism comprises at least a first decision making mechanism adapted to decide if said incoming resource is added to an intermittent node.

Typically, said at least a determination mechanism comprises at least a second decision making mechanism adapted to decide if said incoming is added to a corner node.

Typically, said at least a determination mechanism comprises at least a third decision making mechanism adapted to decide if said incoming resource belongs to one edge.

Typically, said at least a determination mechanism comprises at least a fourth decision making mechanism adapted to decide if said incoming resource belongs to two edges.

Typically,
said at least a determination mechanism comprises at least a first decision making mechanism adapted to decide if said incoming resource is added to an intermittent node;
said at least a determination mechanism comprises at least a third decision making mechanism adapted to decide if said incoming resource belongs to one edge; and
said at least a resource repositioning mechanism comprises at least a first resource replacement task invoking mechanism in order to invoke a first task if output of said at least a first decision making mechanism and said third decision making mechanism is simultaneously true, characterised, in that, said first task comprises a following step to be performed at least once:
for any additional incoming resource on an existing intermittent node, in a designated grid, balancing at least one of the adjacent edges, belonging to that particular grid, by shifting a resource from an adjacent corner grid to any of the corresponding adjacent intermittent nodes.

Typically,
said at least a determination mechanism comprises at least a first decision making mechanism adapted to decide if said incoming resource is added to an intermittent node;
said at least a determination mechanism comprises at least a fourth decision making mechanism adapted to decide if said incoming resource belongs to two edges; and
said at least a resource repositioning mechanism comprises at least a second resource replacement task invoking mechanism in order to invoke a second task if output of said at least a first decision making mechanism and said fourth decision making mechanism is simultaneously true, characterised, in that, said second task comprises a following step to be performed at least twice, in progressive manner, in that, the first step moves the resource from its resident position to its next position, and the second step moves another or same resource to a second next position:
for any additional incoming resource on an existing intermittent node, in a designated grid, balancing at least one of the adjacent edges, belonging to that particular grid, by shifting a resource from an adjacent corner grid to any of the corresponding adjacent intermittent nodes.

Typically,
said at least a determination mechanism comprises at least a second decision making mechanism adapted to decide if said incoming is added to a corner node;
said at least a determination mechanism comprises at least a third decision making mechanism adapted to decide if said incoming resource belongs to one edge; and
said at least a resource repositioning mechanism comprises at least a third resource replacement task invoking mechanism in order to invoke a third task if output of said at least a second decision making mechanism and said third decision making mechanism is simultaneously true, characterised, in that, said third task comprises a following step to be performed at least once:
for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent the first adjacent edge but not being the original edge where the incoming resource was placed, by shifting a resource from a corner node of said first adjacent edge to a (next) corner edge of said second adjacent edge.

Typically,
said at least a determination mechanism comprises at least a second decision making mechanism adapted to decide if said incoming is added to a corner node;
said at least a determination mechanism comprises at least a fourth decision making mechanism adapted to decide if said incoming resource belongs to two edges; and
said at least a resource repositioning mechanism comprises at least a fourth resource replacement task invoking mechanism in order to invoke a fourth task if output of said at least a second decision making mechanism and said fourth decision making mechanism is simultaneously true, characterised, in that, said fourth task comprises a following step to be performed at least twice, in progressive manner, in that, the first step moves the resource from its resident position to its next position, and the second step moves another or same resource to a second next position:

for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent to the first adjacent edge but not being the original edge where the incoming resource was placed, by shifting a resource from a corner node of said first adjacent edge to a (next) corner edge of said second adjacent edge.

According to this invention, there is also provided a dynamic resource repositioning load balancing and location management method in order to reposition an incoming resource in a grid network of nodes, said method comprises the steps of:

mapping a topology of said grid network of nodes, along with its resources, using a first mapping mechanism;

determining at least an incoming resource's initial placement in terms of relative position of said node that the resource currently occupies and in terms of relative number of edges on which said resource currently resides, using a determination mechanism, said relative position being selected from a corner node or an intermittent node in respect of a designated grid;

repositioning said at least a resource, in said grid network of nodes, in response to an incoming resource, using a resource repositioning mechanism, said repositioning based on said determined position of said incoming resource; characterised, in that, said repositioning mechanism being guided by at least a step or a combination of steps or repetition of steps selected from a group of steps consisting of the following:

for any additional incoming resource on an existing intermittent node, in a designated grid, balancing at least one of the adjacent edges, belonging to that particular grid, by shifting a resource from an adjacent corner grid to any of the corresponding adjacent intermittent nodes;

for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent the first adjacent edge but not being the original edge where the incoming resource was placed, by shifting a resource from a corner node of said first adjacent edge to a (next) corner edge of said second adjacent edge.

Typically, said step of determining at least an incoming resource's initial placement in terms of relative position of said node that the resource currently occupies and in terms of relative number of edges on which said resource currently resides comprises at least a further step of deciding if said incoming resource is added to an intermittent node, using a first decision making mechanism.

Typically, said step of determining at least an incoming resource's initial placement in terms of relative position of said node that the resource currently occupies and in terms of relative number of edges on which said resource currently resides comprises at least a further step of deciding if said incoming is added to a corner node, using a second decision making mechanism.

Typically, said step of determining at least an incoming resource's initial placement in terms of relative position of said node that the resource currently occupies and in terms of relative number of edges on which said resource currently resides comprises at least a further step of deciding if said incoming resource belongs to one edge, using a third decision making mechanism.

Typically, said step of determining at least an incoming resource's initial placement in terms of relative position of said node that the resource currently occupies and in terms of relative number of edges on which said resource currently resides comprises at least a further step of deciding if said incoming resource belongs to two edges, using a fourth decision making mechanism.

Typically, said method comprises the steps of:
said step of determining at least an incoming resource's initial placement in terms of relative position of said node that the resource currently occupies and in terms of relative number of edges on which said resource currently resides comprises at least a further step of deciding if said incoming resource is added to an intermittent node, using a first decision making mechanism;

said step of determining at least an incoming resource's initial placement in terms of relative position of said node that the resource currently occupies and in terms of relative number of edges on which said resource currently resides comprises at least a further step of deciding if said incoming resource belongs to one edge, using a third decision making mechanism; and invoking a first task, using a first resource replacement task invoking mechanism, if output of said at least a first decision making mechanism and said third decision making mechanism is simultaneously true, characterised, in that, said first task comprises a following step to be performed at least once:

for any additional incoming resource on an existing intermittent node, in a designated grid, balancing at least one of the adjacent edges, belonging to that particular grid, by shifting a resource from an adjacent corner grid to any of the corresponding adjacent intermittent nodes.

Typically, said method comprises the steps of:
said step of determining at least an incoming resource's initial placement in terms of relative position of said node that the resource currently occupies and in terms of relative number of edges on which said resource currently resides comprises at least a further step of deciding if said incoming resource is added to an intermittent node, using a first decision making mechanism;

said step of determining at least an incoming resource's initial placement in terms of relative position of said node that the resource currently occupies and in terms of relative number of edges on which said resource currently resides comprises at least a further step of deciding if said incoming resource belongs to two edges, using a fourth decision making mechanism; and invoking a second task, using second resource replacement task invoking mechanism, if output of said at least a first decision making mechanism and said fourth decision making mechanism is simultaneously true, characterised, in that, said second task comprises a following step to be performed at least twice, in progressive manner, in that, the first step moves the resource from its resident position to its next position, and the second step moves another or same resource to a second next position:

for any additional incoming resource on an existing intermittent node, in a designated grid, balancing at least one of the adjacent edges, belonging to that particular grid, by shifting a resource from an adjacent corner grid to any of the corresponding adjacent intermittent nodes.

Typically, said method comprises the steps of:

said step of determining at least an incoming resource's initial placement in terms of relative position of said node that the resource currently occupies and in terms of relative number of edges on which said resource currently resides comprises at least a further step of deciding if said incoming resource is added to a corner node, using a second decision making mechanism;

said step of determining at least an incoming resource's initial placement in terms of relative position of said node that the resource currently occupies and in terms of relative number of edges on which said resource currently resides comprises at least a further step of deciding if said incoming resource belongs to one edge, using a third decision making mechanism; and invoking a third task, using a third resource replacement task invoking mechanism, if output of said at least a second decision making mechanism and said third decision making mechanism is simultaneously true, characterised, in that, said third task comprises a following step to be performed at least once:

for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent the first adjacent edge but not being the original edge where the incoming resource was placed, by shifting a resource from a corner node of said first adjacent edge to a (next) corner edge of said second adjacent edge.

Typically, said method comprises the steps of:

said step of determining at least an incoming resource's initial placement in terms of relative position of said node that the resource currently occupies and in terms of relative number of edges on which said resource currently resides comprises at least a further step of deciding if said incoming resource is added to a corner node, using a second decision making mechanism;

said step of determining at least an incoming resource's initial placement in terms of relative position of said node that the resource currently occupies and in terms of relative number of edges on which said resource currently resides comprises at least a further step of deciding if said incoming resource belongs to two edges, using a fourth decision making mechanism; and invoking a fourth task, using fourth resource replacement task invoking mechanism, if output of said at least a second decision making mechanism and said fourth decision making mechanism is simultaneously true, characterised, in that, said fourth task comprises a following step to be performed at least twice, in progressive manner, in that, the first step moves the resource from its resident position to its next position, and the second step moves another or same resource to a second next position:

for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent to the first adjacent edge but not being the original edge where the incoming resource was placed, by shifting a resource from a corner node of said first adjacent edge to a (next) corner edge of said second adjacent edge.

Figure 1:
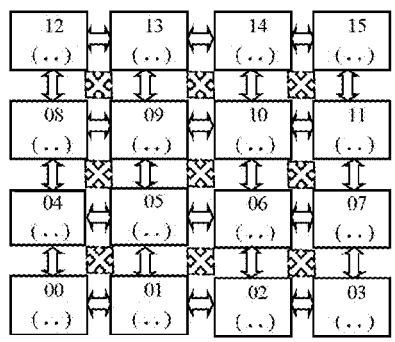
FIG. 1 illustrates one of the existing models of grid layout.
Figure 1:
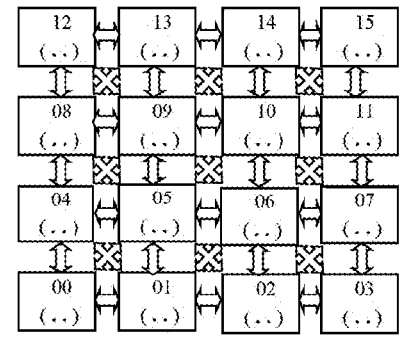
Figure 1:
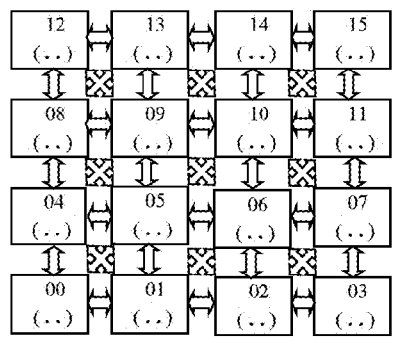
Figure 1:
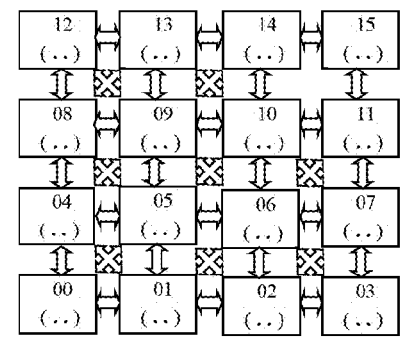
Figure 2:
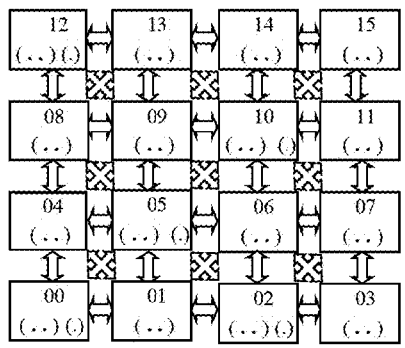
FIG. 2 illustrates one more of the existing models of grid layout, where resources and nodes have been added.
Figure 2:
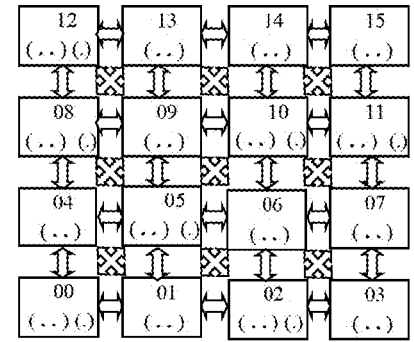
Figure 2:
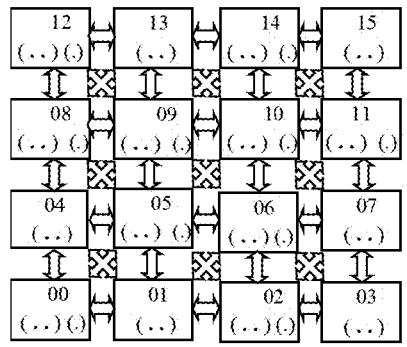
Figure 2:
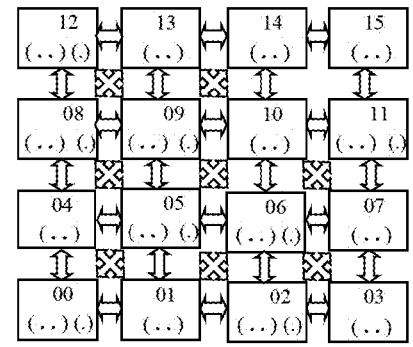
Figure 3:
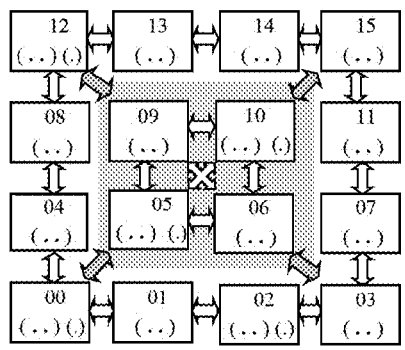
Figure 3:
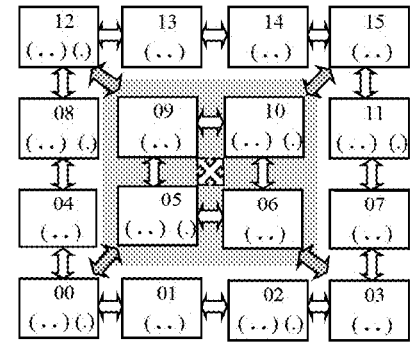
Figure 3:
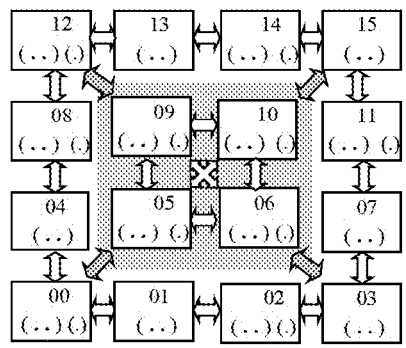
Figure 3:
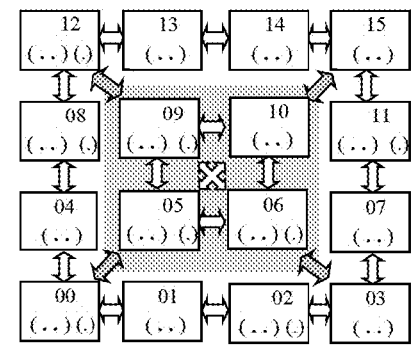
Figure 4:
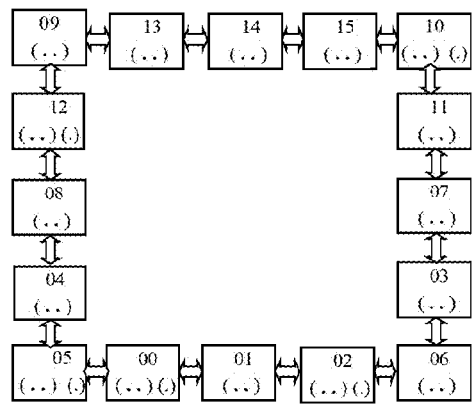
Figure 4:
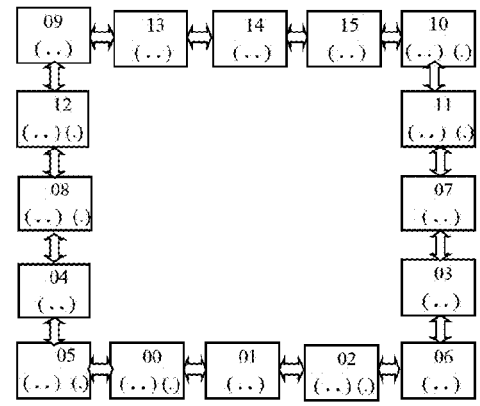
Figure 4:
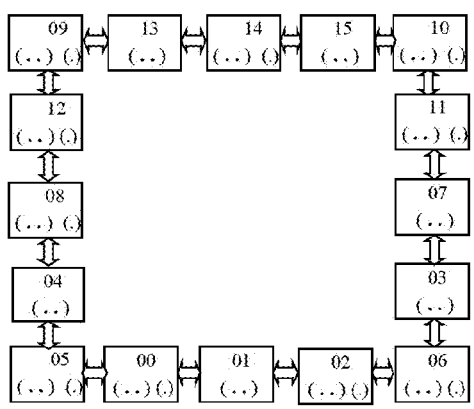
Figure 4:
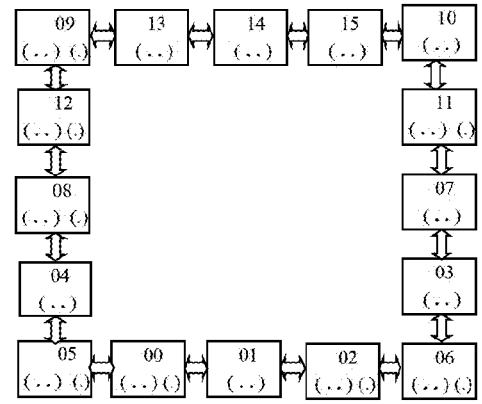
Figure 5:
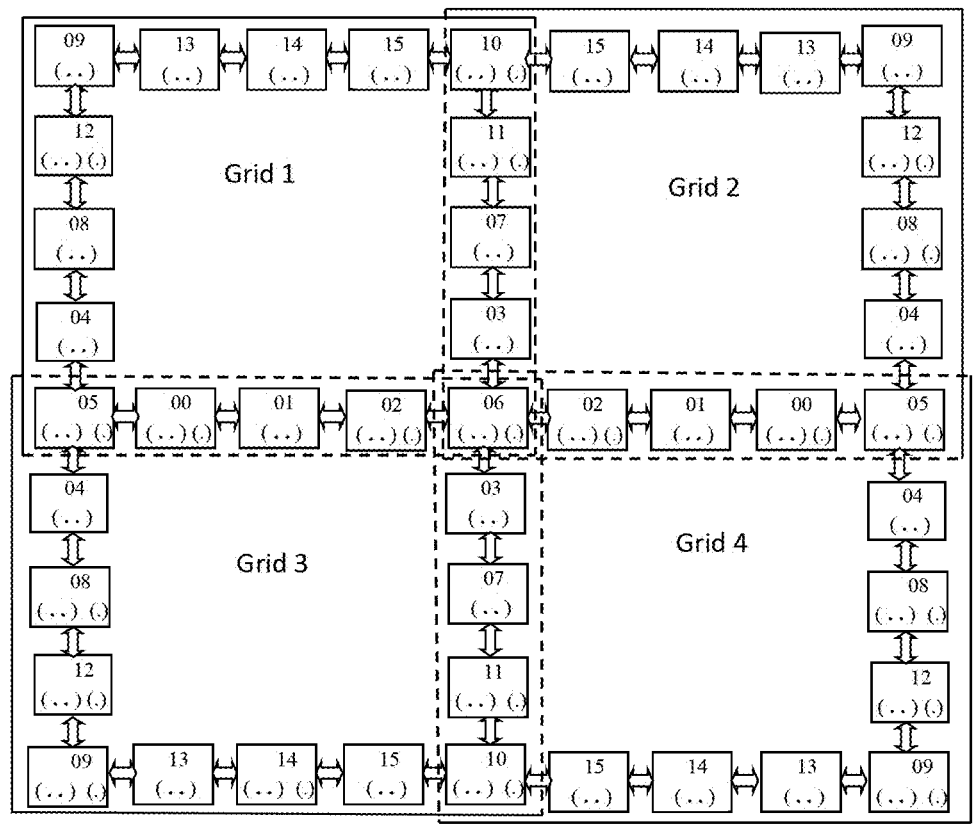
Figure 6:
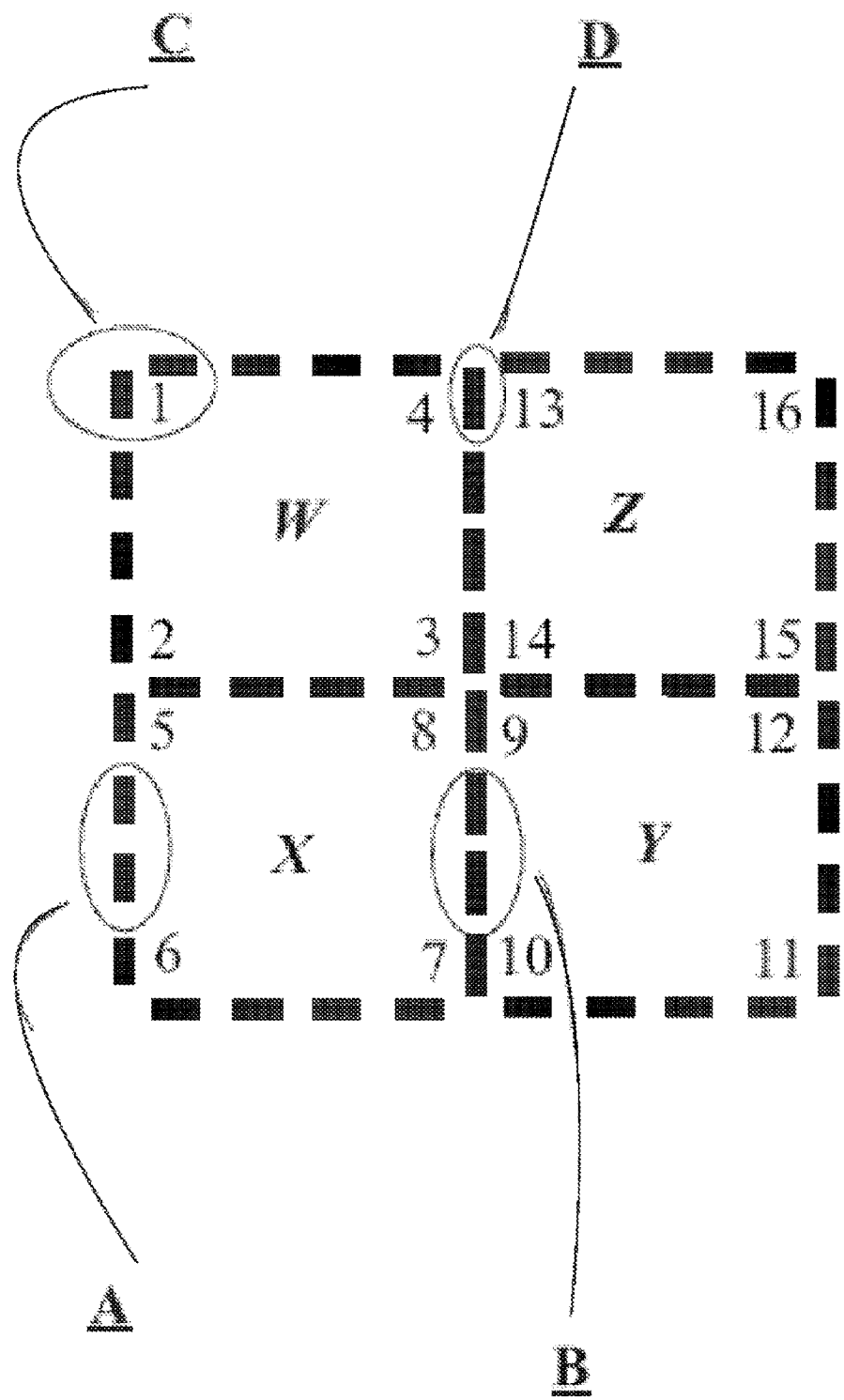

The invention will now be described in relation to the accompanying drawings, in which:

FIG. 3 illustrates a non-limiting exemplary embodiment of use of the system and method of this invention, wherein an initial step of restructuring takes place in order to be used by the system and method of this invention;

FIG. 4 illustrates a non-limiting exemplary embodiment of use of the system and method of this invention, which is obtained after initial restructuring of the grids of FIG. 3;

FIG. 5 illustrates a non-limiting exemplary embodiment of use of the system and method of this invention, which shows a virtual or physical re-modeled initial structure of grid network upon which the system and method of this invention is acted;

FIG. 6 is another representation of the grid network of FIG. 5; and

Figure 7:
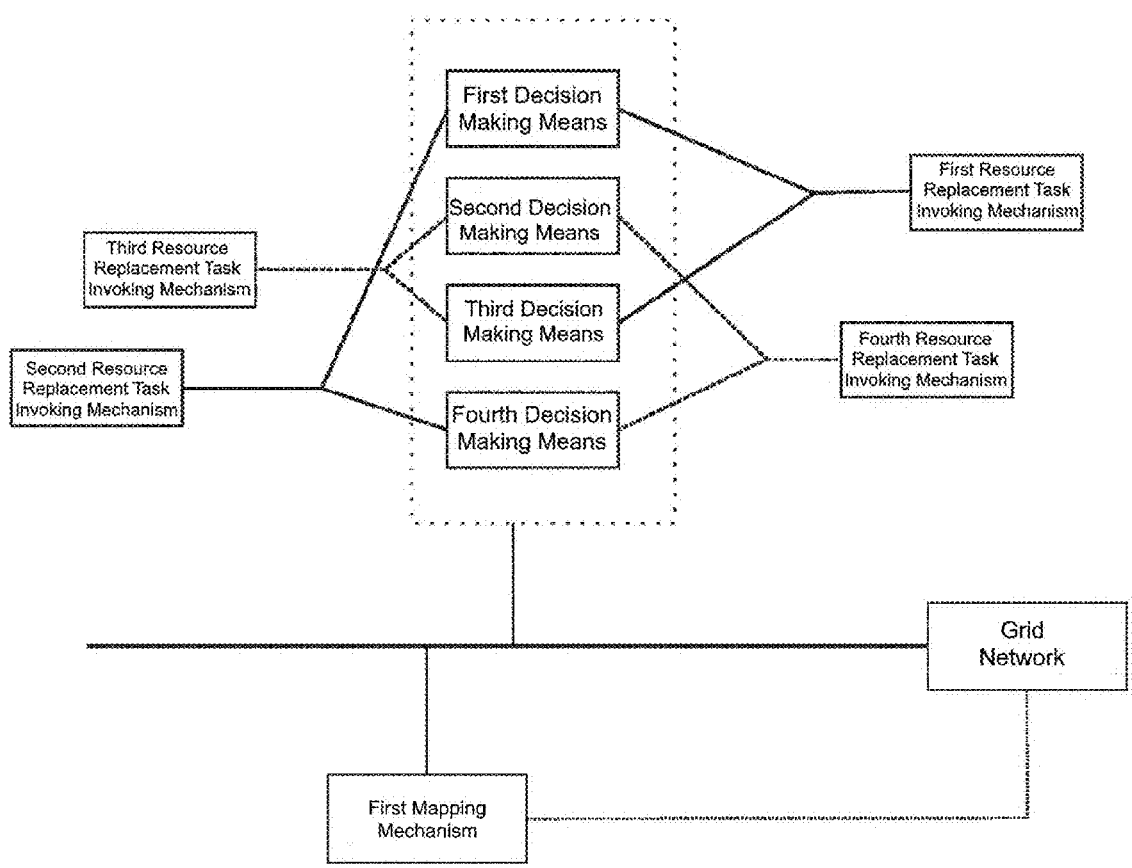

FIG. 7 illustrates a schematic of the resource repositioning load balancing and location management system.

DETAILED DESCRIPTION

One of the problems is that when a job or item or task or node is added to a cluster, load gets increased on that cluster. Here, load metric, as total number of resources available in a network, at a given time, is considered. Hence, there is a need for a system and method that will make this metric static though addition of new resources is going on. The system and method should also make restructuring of resources in such a way that each cluster contain same no of resources.

According to a non-limiting exemplary embodiment of a network, there may be n-grids in the network/system. All grids have some subset of resources. The number and type of resources inside the grid depends on the demand of those resources inside the grid. This demand is attributed by the requests raised by user set in that area. A particular area has certain attributes which decides what and how many requests are there for the resource(s). Depending on this, the localization, number of replica created for the given resource, movement of resources is decided. These elements will decide the frequency of load balancing initiative and the resource imbalance.

Companies such as Google, Yahoo, Facebook, Microsoft, Amazon, Apple, Twitter, and the like generate, maintain, aggregate, and store large volumes of data. Typically, these companies have separate infrastructure for each region. The regions may be divided according to continents or regions re-defined by the companies such as Indian continent, South-East Asian Continent, Asia Pacific region, North Americas, South Americas, Europe, Russia, Australia, Australasia, UK, China, Middle East, and the like. The size and scope of this infrastructure heavily depends on the amount of requests issued per unit time in or for that region. Again, if as per increased request rate, infrastructure is added, there will not be much guarantee that same request rate will persist down the line. This is a major problem to be solved. The total number of resources, provisioned, is proportionally same to the number of requests issued per unit time. Organizations are facing problems in deploying services to these different scenarios. So, it is of utmost requirement put by these organizations which is, that irrespective of any change i.e. increase or decrease in the request rate, infrastructure should be same up to a pre-determined manageable limit. The other problem, in this context, is that although load is balanced to the particular grid, but at a global scenario, (the entire region-wise grid for the specific organization), each grid with different capacity holdings reflects the total imbalance in terms of global consideration.

Furthermore, one of the problems discussed is a problem relating to the pigeonhole principle. E.g. if there are three nests and four birds, and all birds want to lay eggs, and the condition is that one bird can lay eggs in one nest only and no other bird should use the nest used by another bird, then ultimately, one bird cannot find a nest to lay an egg in. Correspondingly, in a network, the total number of users is more than the available resources in a system, there is a problem, at hand.

According to another non-limiting exemplary embodiment, utilization of many energy resources for power generation is helpful in high power requirement stages such that if one source is not able to satisfy the power need then another one will satisfy the load difference. There are several factors, why increased power is required such as extra consumption by existing consumers, addition of new nodes to consume the power, and the like. Considering the maximum power limit of one area in a city=n, if new elements (consuming power) are added, then limit of same area=n+1. Hence, power arrangements need to be made for n+1 nodes. This addition of new power consumer leads to at least two problems: 1) imbalanced network; and 2) difficulty in managing the network infrastructure. The proposed solution to this problem lies in designing a system and method which, regardless of addition of resources, nodes, or new power consumer, balances the network framework to the number that was initially set to the network framework. This should provide for a balanced infrastructure, thereby making it easy to manage. Other advantage of the proposed solution is that there is no requirement to add extra resources where extra power requirement is there, characterized, in that, the power consumer nodes, of this exemplary embodiment, need to be organized in a rather 'special', 'pre-determined' manner such that it conforms to pre-determined rules of re-alignment.

For the purposes of this specification, the term, 'resource' comprises load, objects, data, and the like.

For the purposes of this specification, the term, 'node' comprises a location or a placeholder where a resource or a plurality of resources may reside.

For the purposes of this specification, the term, 'network' or 'grid' comprises a pool of nodes and resources, thereof. Typically, the grid has a particular pattern or architecture, and the network includes a system allowing interaction between two or more electronic devices, and includes any form of inter/intra enterprise environment such as the world wide web, Local Area Network (LAN), Wide Area Network (WAN), Storage Area Network (SAN) or any form of Intranet.

As used herein, the term "intermittent" includes "intermediary" and "interstitial."

As used herein, the term "means" and "mechanism" includes a computer-processor driven device with the named functionality, including a determinator, repositioner, mapper, processor, locator, positioner, decider, etc. Such devices may further include permanent and transient data storage as well as specific programming for the computer processor to execute their functions described below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude or rule out the presence or addition of one or more other features, integers, steps, operations, elements, components, and/or groups thereof.

According to this invention, there is provided a dynamic resource repositioning load balancing and location management system and method.

FIG. 7 illustrates a schematic of the resource repositioning load balancing and location management system.

In accordance with an embodiment of this invention, there is provided a first mapping mechanism (MP1) in order to map topology of said grid network (GNR) of nodes, along with its resources.

Typically, for any arrangement of nodes, and resources thereof, there is a need for restructuring the topology of the grid in accordance with pre-defined rules. These pre-defined rules ensure that the restructured topology is in the format of rectangular or square grids. In at least one non-limiting exemplary embodiment, the arrangement of nodes, and resources thereof is in accordance with FIG. 3 to 5 of the accompanying drawings. The rectangular or square grids may be aligned end to end such that edges may be shared. This may in 2-dimensional or in 3-dimensional format. The system and method of this invention will be applied to this restructured topology. In at least one embodiment, this restructuring is physical. In at least an alternative embodiment, this restructuring is logical or virtual.

An incoming additional resource requested by node imbalances the grid network, which is to be balanced. Assuming that the existing grid network of resources is balanced, an incoming additional resource may off balance the grid network of resources if not placed appropriately. The system and method of this invention ensures appropriate placement or replacement of resources.

In accordance with another embodiment of this invention, there is provided a determination mechanism (DTM) in order to determine the relative placement or relative position of the incoming additional resource and in order to further determine the relative number of edges on which the incoming additional resource resides. This determined relative placement or relative position is the instantaneous placement or position, meaning that this is the first or initial placement or position of the incoming additional resource. The relative placement or relative position of the incoming resource is selected from the placement of position being a corner node or an intermittent node. This determined relative number of edges is the instantaneous number of edges that the incoming resource shared, meaning that these are the number of edges which are firstly or initially shared during the first or initial placement or position of the incoming additional resource.

In accordance with another embodiment of this invention, there is provided a control layer mechanism adapted to control location of resource to be added. Firstly, an incoming resource is placed on to a node depending upon pre-defined rules of the network hosting the nodes and resources. These incoming additional resources need to be located or re-located upon specific nodes such that the entire network is balanced.

In accordance with another embodiment of this invention, there is provided a first decision making means (DM1) adapted to decide if the incoming resource that has been added is added to an intermittent node or not.

In accordance with another embodiment of this invention, there is provided a second decision making means (DM2) adapted to decide if the incoming resource that has been added is added to a corner node or not.

In accordance with another embodiment of this invention, there is provided a third decision making means (DM3) adapted to decide if the incoming resource that has been added belongs to a single edge or not.

In accordance with another embodiment of this invention, there is provided a fourth decision making means (DM4) adapted to decide if the incoming resource that has been added belongs to two or more edges or not.

In accordance with still another embodiment of this invention, there is provided a first resource replacement task invoking mechanism (RT1) configured to be activated if the output of the first decision making means as well as the output of the third decision making means is concurrently true. This means that the incoming resource that has been added to the grid network of resources belongs to an intermittent node and belongs to one edge only. The task associated with the first resource replacement task invoking mechanism is as follows: for any additional incoming resource on an existing intermittent node, in a designated grid, balancing at least one of the adjacent edges, belonging to that particular grid, by shifting a resource from an adjacent corner grid to any of the corresponding adjacent intermittent nodes. This first task needs to be followed at least once. This first resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a second resource replacement task invoking mechanism (RT2) configured to be activated if the output of the first decision making means as well as the output of the fourth decision making means is concurrently true. This means that the incoming resource that has been added to the grid network of resources belongs to an intermittent node and belongs to two or more edges. The task associated with the second resource replacement task invoking mechanism is as follows: for any additional incoming resource on an existing intermittent node, in a designated grid, balancing at least one of the adjacent edges, belonging to that particular grid, by shifting a resource from an adjacent corner grid to any of the corresponding adjacent intermittent nodes. This second task needs to be followed at least twice, in progressive manner, in that, the first step moves the resource from its resident position to its next position, and the second step moves another or same resource to a second next position. This second resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a third resource replacement task invoking mechanism (RT3) configured to be activated if the output of the second decision making means as well as the output of the third decision making means is concurrently true. This means that the incoming resource that has been added to the grid network of resources belongs to a corner node and belongs to one edge only. The task associated with the third resource replacement task invoking mechanism is as follows: for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent the first adjacent edge but not being the original edge where the incoming resource was placed, by shifting a resource from a corner node of said first adjacent edge to a (next) corner edge of said second adjacent edge. This third task needs to be followed at least once. This third resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a fourth resource replacement task invoking mechanism (RT4) configured to be activated if the output of the second decision making means as well as the output of the fourth decision making means is concurrently true. This means that the incoming resource that has been added to the grid network of resources belongs to a corner node and belongs to two or more edges. The task associated with the fourth resource replacement task invoking mechanism is as follows: for any additional incoming resource on an existing corner node, in a designated grid, balancing at least one of the first adjacent edges, belonging to that particular grid, by shifting a resource from said corner node to any of the corresponding adjacent intermittent nodes and further balancing at least one of the second adjacent edges, said second adjacent edge being further adjacent to the first adjacent edge but not being the original edge where the incoming resource was placed, by shifting a resource from a corner node of said first adjacent edge to a (next) corner edge of said second adjacent edge. This fourth task needs to be followed at least twice, in a progressive manner, in that, the first step moves the resource from its resident position to its next position, and the second step moves another or same resource to a second next position. This fourth resource replacement task invoking mechanism may be configured to use buffer memories, serial buses, parallel buses, and/or shift registers, resource locators, resource handlers; which are all advantageously configured to perform the task associated with it, as disclosed above.

FIG. 3 illustrates a non-limiting exemplary embodiment of use of the system and method of this invention, wherein an initial step of restructuring takes place in order to be used by the system and method of this invention. Below is an associated Table 3.

TABLE 3

| Time Instance | Number of resources available | No. of resources added | Grid-1 | Grid-2 | Grid-3 | Grid-4 |
| --- | --- | --- | --- | --- | --- | --- |
| T3 | 32 * 4 = 128 | 30 | Shift the core modules to the closest corner of the respective grid. | Shift the core modules to the closest corner of the respective grid. | Shift the core modules to the closest corner of the respective grid. | Shift the core modules to the closest corner of the respective grid. |

FIG. 4 illustrates a non-limiting exemplary embodiment of use of the system and method of this invention, which is obtained after initial restructuring of the grids of FIG. 3. Below is an associated Table 4.

TABLE 4

| Time Instance | Number of resources available | No. of resources added | Grid-1 | Grid-2 | Grid-3 | Grid-4 |
| --- | --- | --- | --- | --- | --- | --- |
| T4 | 32 * 4 = 128 | 30 | Replace the closest corner of the respective grid with core module. | Replace the closest corner of the respective grid with core module. | Replace the closest corner of the respective grid with core module. | Replace the closest corner of the respective grid with core module. |

FIG. 5 illustrates a non-limiting exemplary embodiment of use of the system and method of this invention, which shows a virtual or physical re-modeled initial structure of grid network upon which the system and method of this invention is acted. Below is an associated Table 5.

TABLE 5

| Time Instance | Number of resources available | No. of resources added | Grid-1 | Grid-2 | Grid-3 | Grid-4 |
| --- | --- | --- | --- | --- | --- | --- |
| T5 | 32 * 4 = 128 | 30 | Merge All the grids in such a way that commonality among resources as a result of replication belongs to the shared modules between respective clusters. i.e. node 6 contains resources shared by all four clusters. | Merge All the grids in such a way that commonality among resources as a result of replication belongs to the shared modules between respective clusters. i.e. node 6 contains resources shared by all four clusters | Merge All the grids in such a way that commonality among resources as a result of replication belongs to the shared modules between respective clusters. i.e. node 6 contains resources shared by all four clusters | Merge All the grids in such a way that commonality among resources as a result of replication belongs to the shared modules between respective clusters. i.e. node 6 contains resources shared by all four clusters |

FIG. 6 is another representation of the grid network of FIG. 5 where the reference numerals are as follows: A—incoming additional resource is initially located on intermittent node belong to one edge (before load balancing system and method of this invention);

B—incoming additional resource is initially located on intermittent node belong to two edges (before load balancing system and method of this invention);
C—incoming additional resource is initially located on corner node belong to one edge (before load balancing system and method of this invention); and
D—incoming additional resource is initially located on corner node belong to two edges (before load balancing system and method of this invention).

Furthermore, according to a non-limiting exemplary embodiment, this system and method steps are proved below. Once the grid layout is changed to unbalanced condition, the system and method is applied to check whether the given number of resources remain constant or not; in a balanced condition. When new request arrives for which resource is not available, system will add new resource. In such scenario, the system and method considers the total number of resources available inside grid as load index. When the system and method adds resource, load index will be increased, and when the system and method deletes the resource, load index will decrease. Below is an associated Table 6.

Grid-2: 32+7=39, Grid-2: 32+10=42, Grid-2: 32+8=40). Hence the system and method provides a technical advancement, in that, an innovative relocation scheme is provided in such a way that each grid shows a complete balanced view at the given instance, though resources gets added or get removed from grid.

The data, in each of the components, means, modules, mechanisms, units, devices of the system and method may be 'encrypted' and suitably 'decrypted' when required.

The systems described herein can be made accessible through a portal or an interface which is a part of, or may be connected to, an internal network or an external network, such as the Internet or any similar portal. The portals or interfaces are accessed by one or more of users through an electronic device, whereby the user may send and receive data to the portal or interface which gets stored in at least one memory device or at least one data storage device or at least one server, and utilises at least one processing unit. The portal or interface in combination with one or more of memory device, data storage device, processing unit and serves, form an embedded computing setup, and may be

TABLE 6

| Stage | Number of resources available | No. of resources added | Grid-1 | Grid-2 | Grid-3 | Grid-4 |
|---|---|---|---|---|---|---|
| T1 | 32 * 4 = 128 | 0 | 32 | 32 | 32 | 32 |
| T2 | 32 * 4 = 128 128 + 30 = 158 | 30 | 32 + 5 = 37 | 32 + 7 = 39 | 32 + 10 = 42 | 32 + 8 = 40 |
| T3 | 32 * 4 = 128 128 + 30 = 158 | 30 | Shift the core modules to the closest corner of the respective grid. | Shift the core modules to the closest corner of the respective grid. | Shift the core modules to the closest corner of the respective grid. | Shift the core modules to the closest corner of the respective grid. |
| T4 | 32 * 4 = 128 128 + 30 = 158 | 30 | Replace the closest corner of the respective grid with core module. | Replace the closest corner of the respective grid with core module. | Replace the closest corner of the respective grid with core module. | Replace the closest corner of the respective grid with core module. |
| T5 | 32 * 4 = 128 128 + 30 = 158 | 30 | Merge All the grids in such a way that commonality among resources as a result of replication belongs to the shared modules between respective grids. i.e. node 6 contains resources shared by all four grids. | Merge All the grids in such a way that commonality among resources as a result of replication belongs to the shared modules between respective grids. i.e. node 6 contains resources shared by all four grids. | Merge All the grids in such a way that commonality among resources as a result of replication belongs to the shared modules between respective grids. i.e. node 6 contains resources shared by all four grids. | Merge All the grids in such a way that commonality among resources as a result of replication belongs to the shared modules between respective grids. i.e. node 6 contains resources shared by all four grids. |
| T6 | 32 * 4 = 128 128 + 30 = 158 | 30 | 32 | 32 | 32 | 32 |

Once grid reaches step 5, the system and method of this invention will get executed in step 6 which will balance the grid in such a way that total number of resources available in the individual grid with modified structure (stage T5) will be 32. Though stage 2 results into modified count in the resources available in individual grid i.e. (Grid-1: 32+5=37, used by, or used in, one or more of a non-transitory, computer readable medium. In at least one embodiment, the embedded computing setup and optionally one or more of a non-transitory, computer readable medium, in relation with, and in combination with the said portal or interface forms one of the systems of the invention. Typical examples of a portal or interface may be selected from but is not limited to a website, an executable software program or a software application.

The systems and methods may simultaneously involve more than one user or more than one data storage device or more than one host server or any combination thereof.

A user may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a cave, pointing stick The systems and methods can be practiced using any electronic device which may be connected to one or more of other electronic device with wires or wirelessly which may use technologies such as but not limited to, Bluetooth, Wi-Fi, Wimax. This will also extend to use of the aforesaid technologies to provide an authentication key or access key or electronic device based unique key or any combination thereof.

In at least one embodiment, one or more user can be blocked or denied access to one or more of the aspects of the invention.

Encryption can be accomplished using any encryption technology, such as the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content can be performed in accordance with any technology including utilizing an encryption algorithm. The encryption algorithm utilized is not hardware dependent and may change depending on the digital content. For example, a different algorithm may be utilized for different websites or programs. The term 'encryption' further includes one or more aspects of authentication, entitlement, data integrity, access control, confidentiality, segmentation, information control, and combinations thereof.

The described embodiments may be implemented as a system, method, apparatus or article of manufacture using standard programming and/or engineering techniques related to software, firmware, hardware, or any combination thereof. The described operations may be implemented as code maintained in a "non-transitory, computer readable medium", where a processor may read and execute the code from the non-transitory, computer readable medium. A non-transitory, computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

The systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, tablet computers, mobile phones, laptop computers, palmtops, portable media players, and personal digital assistants. In an embodiment, the computer readable medium data storage unit or data storage device is selected from a set of but not limited to USB flash drive (pen drive), memory card, optical data storage discs, hard disk drive, magnetic disk, magnetic tape data storage device, data server and molecular memory.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory, computer readable medium at the receiving and transmitting stations or devices. An "article of manufacture" comprises non-transitory, computer readable medium or hardware logic, and/or transmission signals in which code may be implemented. A device in which the code implementing the described embodiments of operations is encoded may comprise a non-transitory, computer readable medium or hardware logic. Of course, those skilled in the art will recognize that many modifications may be made to this configuration without departing from the scope of the present invention, and that the article of manufacture may comprise suitable information bearing medium known in the art.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

What is claimed is:

1. A dynamic resource repositioning load balancing and location management system in order to reposition an incoming resource in a grid network of nodes, the system comprising:
   a first mapping computer processor configured to map topology of the grid network of nodes, along with its resources;
   a determination computer processor configured to determine at least an incoming resource's initial placement in terms of relative position of the node that the resource currently occupies and in terms of relative number of edges on which the resource currently resides, wherein the relative position is selected from a corner node or an intermittent node in respect to a designated grid; and
   a resource repositioning computer processor configured to reposition the resource in the grid network of nodes in response to an incoming resource, wherein the repositioning is based on the determined position of the incoming resource, and wherein the resource repositioning computer processor is guided by at least a step or a combination of steps or repetition of steps selected from a group of steps consisting of, for any additional incoming resource on an existing intermittent node in a designated grid, balancing at least one of the adjacent edges belonging to the designated grid by shifting a resource from an adjacent corner grid to any corresponding adjacent intermittent nodes, and for any additional incoming resource on an existing corner node in a designated grid, balancing at least one of the first adjacent edges belonging to the designated grid by shifting a resource from the corner node to any corresponding adjacent intermittent nodes and further balancing at least one of the second adjacent edges, wherein the second adjacent edge is further adjacent to the first adjacent edge but not the original edge where the incoming resource was placed by shifting a resource from a corner node of the first adjacent edge to a next corner edge of the second adjacent edge.

2. A resource repositioning load balancing and location management system as claimed in claim 1 wherein, the determination computer processor is further configured to decide if the incoming resource is added to an intermittent node.

3. A resource repositioning load balancing and location management system as claimed in claim 1 wherein, the determination computer processor is further configured to decide if the incoming is added to a corner node.

4. A resource repositioning load balancing and location management system as claimed in claim 1 wherein, the determination computer processor is further configured to decide if the incoming resource belongs to one edge.

5. A resource repositioning load balancing and location management system as claimed in claim 1 wherein, the determination computer processor is further configured to decide if the incoming resource belongs to two edges.

6. A resource repositioning load balancing and location management system as claimed in claim 1 wherein, the determination computer processor is further configured to decide if the incoming resource is added to an intermittent node;

the determination computer processor is further configured to decide if the incoming resource belongs to one edge; and the resource repositioning computer processor is further configured to invoke a first task if the at least a determination computer processor determines that both the incoming resource belongs to an edge and is added to an intermittent node, wherein the first task includes, for any additional incoming resource on an existing intermittent node in a designated grid, balancing at least one of the adjacent edges belonging to the designated grid by shifting a resource from an adjacent corner grid to any corresponding adjacent intermittent nodes.

7. A resource repositioning load balancing and location management system as claimed in claim 1 wherein, the determination computer processor is further configured to decide if the incoming resource is added to an intermittent node and to decide if the incoming resource belongs to two edges, and the resource repositioning computer processor is further configured to invoke a second task if the determination computer processor determines that both the incoming resource is added to the intermittent node and the incoming resource belongs to two edges where the second task includes a step performed twice, in progressive manner to move the resource from its resident position to its next position and to move another or same resource to a second next position, wherein the step includes, for any additional incoming resource on an existing intermittent node in a designated grid, balancing at least one of the adjacent edges belonging to the designated grid by shifting a resource from an adjacent corner grid to any corresponding adjacent intermittent nodes.

8. A resource repositioning load balancing and location management system as claimed in claim 1 wherein, the determination computer processor is further configured to decide if the incoming resource is added to a corner node, the determination computer processor is further configured to decide if the incoming resource belongs to one edge, and the resource repositioning computer processor configured to invoke a third task if the determination computer processor determines that the incoming resource is added to the corner node and belongs to one edge, wherein the third task includes, for any additional incoming resource on an existing corner node in a designated grid, balancing at least one of the first adjacent edges belonging to that particular grid by shifting a resource from the corner node to any corresponding adjacent intermittent nodes and further balancing at least one of the second adjacent edges, wherein the second adjacent edge is further adjacent to the first adjacent edge but not the original edge where the incoming resource was placed by shifting a resource from a corner node of the first adjacent edge to a next corner edge of the second adjacent edge.

9. A resource repositioning load balancing and location management system as claimed in claim 1 wherein, the determination computer processor is further configured to decide if the incoming resource is added to a corner node, the determination computer processor is further configured to decide if the incoming resource belongs to two edges; and the resource repositioning computer processor is configured to invoke a fourth task if the determination computer processor determines that the incoming resource is both added to a corner node and belongs to two edges, wherein the fourth task includes a step performed twice in progressive manner, to move the resource from its resident position to its next position, and to move another or same resource to a second next position, wherein the step includes, for any additional incoming resource on an existing corner node in a designated grid, balancing at least one of the first adjacent edges belonging to the designated grid by shifting a resource from the corner node to any corresponding adjacent intermittent nodes and further balancing at least one of the second adjacent edges, wherein the second adjacent edge is further adjacent to the first adjacent edge but not the original edge where the incoming resource was placed, by shifting a resource from a corner node of the first adjacent edge to a next corner edge of the second adjacent edge.

10. A dynamic resource management and repositioning system for a network, the system comprising:
- a computer-processor-based mapper configured to determine node positions of existing resources in a rectilinear grid having nodes at corners and interstitials between the corners;
- a computer-processor-based determinator configured to determine an initial placement of an incoming resource in terms of grid and node type of the grid;
- a computer-processor-based resource repositioner configured to reposition the incoming resource in the grid, wherein the repositioner is configured to reposition based on the determined initial placement of the incoming resource and based on at least one of,
  - if the incoming resource is initially on an interstitial node, shifting a resource from another grid at a corner node to an interstitial node of the grid, and
  - if the incoming resource is initially on a corner node, shifting a resource from the corner node to an interstitial node adjacent to the corner node, and shifting a resource from a corner node adjacent to the interstitial node to a different corner adjacent to the interstitial node.

11. The method of claim 10, wherein the network is an electrical power generation network, and the resources are electrical consumers on a power grid.

12. The method of claim 10, wherein the network is a computer network, and the resources are computer users.

* * * * *